United States Patent
Olberding et al.

(10) Patent No.: US 7,179,541 B2
(45) Date of Patent: Feb. 20, 2007

(54) HEAT TREATMENT METHOD FOR A COLD-ROLLED STRIP WITH AN NI AND/OR CO SURFACE COATING, SHEET METAL PRODUCIBLE BY SAID METHOD AND BATTERY CAN PRODUCIBLE BY SAID METHOD

(75) Inventors: Werner Olberding, Velbert (DE); Beate Monscheuer, Monheim (DE); Claudia Dahmen, Viersen (DE); Karlfried Pfeifenbring, Duisburg (DE)

(73) Assignee: Hille & Muller GmbH (DE)

( * ) Notice: Subject to any disclaimer, the term of this patent is extended or adjusted under 35 U.S.C. 154(b) by 384 days.

(21) Appl. No.: 10/481,289

(22) PCT Filed: Jun. 12, 2002

(86) PCT No.: PCT/EP02/06431

§ 371 (c)(1),
(2), (4) Date: Jul. 2, 2004

(87) PCT Pub. No.: WO03/000937

PCT Pub. Date: Jan. 3, 2003

(65) Prior Publication Data

US 2004/0238078 A1 Dec. 2, 2004

(30) Foreign Application Priority Data

Jun. 21, 2001 (DE) ................ 101 29 900

(51) Int. Cl.
*H01M 2/02* (2006.01)
*B32B 15/01* (2006.01)
*C22F 1/10* (2006.01)
*C25D 5/50* (2006.01)

(52) U.S. Cl. ............... 428/679; 428/935; 148/518; 148/537; 205/227; 205/228; 427/383.7; 429/163

(58) Field of Classification Search .............. None
See application file for complete search history.

(56) References Cited

U.S. PATENT DOCUMENTS

| 4,302,256 | A  |   | 11/1981 | Kenton |          |
|-----------|----|---|---------|--------|----------|
| 4,908,280 | A  | * | 3/1990  | Omura et al. | 428/679 |
| 4,910,096 | A  | * | 3/1990  | Junkers et al. | 428/610 |
| 5,993,994 | A  | * | 11/1999 | Ohmura et al. | 429/176 |
| 6,126,759 | A  | * | 10/2000 | Hosoya et al. | 148/320 |
| 6,613,163 | B1 | * | 9/2003  | Pfeifenbring et al. | 148/518 |
| 6,852,445 | B1 | * | 2/2005  | Schmidt et al. | 429/163 |
| 6,982,011 | B1 | * | 1/2006  | Pfeifenbring et al. | 148/518 |

FOREIGN PATENT DOCUMENTS

| CN | 1137332    | 12/1996 |
| EP | 0 725 453  | 8/1996  |
| WO | WO 01/11114 | 2/2001 |

* cited by examiner

Primary Examiner—John J. Zimmerman
(74) Attorney, Agent, or Firm—Cantor Colburn LLP

(57) ABSTRACT

A method for heat treatment of a cold rolled strip with a surface coating of Ni and/or Co and incorporated non-metallic elements C and/or S, if need be with the addition of Fe, In, Pd, Au and/or Bi, whereby the cold rolled strip has a low carbon content. Since the compounds of C, S, N and P deposited on the grain boundaries bring about the most micro-cracks with the surface coating metal if no recrystallization takes place, the temperature of the heat treatment should be selected lower than the recrystallization temperature and higher than the precipitation temperature. With a recrystallization, the grain sizes would easily attain the thickness of the coating so that the embrittled compounds would migrate with the grain boundaries out of the coating. Due to the choice of temperature of the heat treatment of the surface coating of the invention, in contrast, an optimal embrittlement of the grain boundaries is guaranteed, which is especially advantageous in the manufacture of battery cans. Furthermore the sheet metal which can be manufactured in accordance with the invention and the corresponding battery can are described.

35 Claims, No Drawings

HEAT TREATMENT METHOD FOR A COLD-ROLLED STRIP WITH AN NI AND/OR CO SURFACE COATING, SHEET METAL PRODUCIBLE BY SAID METHOD AND BATTERY CAN PRODUCIBLE BY SAID METHOD

FIELD OF THE INVENTION

The invention concerns a method for heat-treating a cold rolled strip with a surface coating of Ni and/or Co and integrated non-metallic elements C and/or S, if need be with the addition of Fe, In, Pd, Au and/or Bi, whereby the cold rolled strip has a low carbon content.

DESCRIPTION OF THE RELATED ART

It is known from the literature that the hardness of coatings can be increased by selective temperature treatment. This leads to an increase in hardness and brittleness and to a generally undesirable tearing of coatings during forming. In contrast, this effect is desirable in manufacturing battery cans.

Galvanic (electrolytic) and autocatalytic coatings are known coating methods whereby the most frequent coatings are Ni or Co coatings, or coatings of other alloys. Most frequent are Ni coatings, on the basis of which the following explanations are being made, which, however, also apply for other similar coatings.

In electrolytic coating, a current is applied to the material to be coated which dips into a solution containing Ni ions. The nickel is converted into metallic nickel and forms a coating on the material. If organic substances are admixed to the treatment bath then the coating is precipitated with another morphology, which leads to a harder layer and to a glossy appearance of the layer. Degradation products of organic substances are incorporated into the layer. In general, it is C or S, but N and P are also possible.

The type of autocatalytic Ni coating has several names which all describe the same process: "Autocatalytic," "external currentless" or "chemical nickel-plating." In this method, the nickel is not converted into metallic nickel by "current," but a substance is added to the treatment bath, which supplies the electrons necessary for the conversion. Generally a phosphorus-containing substance is used for this reaction. Degradation products of this phosphorus-containing substance are incorporated into the layer, and indeed in a basically higher concentration than C and S in the electrolytic bright nickel bath (6 to 12% in comparison to 0.001 to 0.1%). It is known that these phosphorus-containing layers are very hard and that their hardness can be increased by temperature treatment. However the precipitation rate of this method is considerably slower than that of galvanic nickel plating, and for this reason, the autocatalytic coating is in many cases disadvantageous from a commercial perspective.

Basically all known bath types can be selected for applying the layer for galvanic coating. Let merely the so-called Watts bath and the sulfamate bath be mentioned here as examples for nickel-plating. These baths are also suitable for applying Co or Co/Ni alloy coatings in modified form.

The publication "Electrolytically Separated Nickel Layers-Influence of the Sulfur Content of Hardness and Ductility" (Kreya et al., p. 584–587, 1995) appeared in the trade journal Metal Surface 49. It is oriented around the precipitation of nickel for the manufacture of stamping foils. The content of the publication is the embrittlement by temperature treatment of Ni layers, which were precipitated out of sulfamate baths. It was established that sulfur-containing layers become embrittled following temperature treatment above the recrystallization temperature in that the sulfur accumulates on the grain boundaries. It is suspected that the accumulated sulfur is carried along with the migration of the grain boundaries. The annealing temperature above which an embrittlement takes place in the layers separated from saccharin (sulfur-containing compound in the electrolyte) depends upon the sulfur content in the layer and begins at about 250° C. to 350° C. It has furthermore been established that additionally incorporated manganese avoids an embrittlement of the layer.

The publication "Chemical Nickel Layers-Properties and Layer Combinations" (Electroplating 53, page 34–36, 1999) describes how the formation of $Ni_3P$ crystals occurs due to a heat treatment of external currentless, precipitated Ni layers, wherein said crystals bring about a mixed crystal hardening. In contrast to this, galvanically separated Ni layers behave otherwise. Here usually sulfur-containing compounds, as a rule saccharin, are added to the bath for increasing hardness, which are incorporated into the layer. That the nickel possesses but a very restricted heat resistance as a consequence of the sulfur content and already becomes embrittled somewhat above 200° C. is mentioned as a disadvantage of this method, since the S shifts the recrystallization temperature of the galvanic nickel to lower values. Due to the recrystallized nickel layer with a low hardness, the entire layer system breaks with a punctiform load.

In the publication "Progress report of the VDI, On the Microstructure and the Properties of Galvanically Precipitated Nickel Layers" (Müller, p. 73–76, 1987), tests with regard to the behavior of electrolytically precipitated Ni layers from sulfamate baths with and without the addition of saccharin in the current density range from 0.5 to 16 A/dm² are examined. The goal of the work is, among other things, studying microcrystal faults in the Ni layers. It is established that fine precipitations of $Ni_3S_2$ forms on the grain boundaries at heat treatment above 200° C. This leads to an embrittlement of the material with heat treatment at 250° C. On account of the micro internal stresses, only a slight change in the microstructure takes place between room temperature and about 200° C. Nonetheless, with one hour annealings in the temperature range from 200° C. to 400° C., the layers recrystallize. Above 400° C., the layers recrystallize with a diminution of hardness. Excessively high incorporation rates of sulfur-containing compounds into the galvanic nickel layer can lead to the embrittlement of the nickel layers in connection with heat treatments due to the formation of nickel sulfide particles.

Applying an Ni/Sn alloy layer to the material for drawing battery cans to improve the contact of the cathode mass with the pre-nickel-plated material through the formation of so-called "micro-cracks" is proposed in EP 0 725 453 A1. The underlying idea is to enlarge the surface and to make available a greater contact surface therewith. The possibility of applying a hard Ni layer beneath the Ni/Sn layer using sulfur-containing bright additives and a temperature treatment is described. This generates further micro-cracks in addition to the micro-cracks of the Ni/Sn alloy layer during drawing, raising the output of the battery further. Typical temperatures for the temperature treatment lie above 400° C.

In sum, the state of the art can be judged to the effect that all temperature treatments which embrittle nickel speak of recrystallization in which a migration of non-metallic elements, such as C and S, into the grain boundaries takes place. The non-metallic elements embrittle the grain boundaries, especially with the formation of compounds (foreign substances) with the surface coating metal, and with a subsequent transformation process, preferably with deep drawing and iron drawing, the grain boundaries tear and small micro-cracks are formed. These micro-cracks have, as already explained, a decisive advantage above all in batteries, since as low an electrical conductance resistance as possible is desirable on the internal surface to avoid unnecessary losses.

SUMMARY OF THE INVENTION

The invention is based upon the objective of attaining a method for improving the embrittlement of such surface coatings for cold rolled steels which can be subjected to deep drawing, preferably for the manufacture of metal sheets for battery cans.

It is proposed as a realization of this objective that the temperature selected for heat treatment lie beneath the recrystallization temperature of the surface coating and above the precipitation temperature for compounds which accumulate on the grain boundaries and which consist of non-metallic elements and surface coating metal.

Due to the advantageous selection of heat treatment of the surface coating in which the temperature is high enough for precipitation of compounds of the coating metal and non-metallic elements, but still no recrystallization of the surface coating takes place, an optimal embrittlement of the grain boundaries of the surface coating is guaranteed without having recourse to battery poisons such as tin. The disadvantage of the previously known methods with associated recrystallization consists in the thickness of the coating, which generally is in the same order of magnitude as the grain size of the recrystallizing surface coating. Since the compounds on the grain boundaries are precipitated, a recrystallization of the coating leads to a migration of the non-metallic component out of the coating and the embrittlement is at least in part restored. Furthermore the number of grain boundaries in the coating is reduced by a recrystallization on account of grain enlargement. If one avoids recrystallization during heat treatment, then the grain boundaries are preserved and the brittle surface coating tears with the subsequent reforming of the material. A subsequently applied carbon-containing coating for diminishing the internal resistance of the battery or the cathode material of an alkaline $Zn/MnO_2$ battery, for example, adheres very well to the surface so cracked. This overall leads to an improvement of the conductivity of the battery, especially for applications in which high currents are needed.

DETAILED DESCRIPTION

The following Tables 1 and 2 illustrate, on the basis of some examples, at which temperatures heat treatment should take place in order to attain a maximal crack formation in the coating. The heat treatment is conducted at a temperature just below the recrystallization temperature, in order to guarantee a most rapid as possible precipitation of the embrittled compounds without the embrittled compounds migrating out due to a recrystallization of the coating.

Ni coating structures can be inferred from Table 1 as a function of temperature.

TABLE 1

Ni coating structures

| Additive | # | Temperature treatment [° C.] | Hardness | Structure of Coating |
|---|---|---|---|---|
| Free of additives | 1A | — | 200 | Stem |
| | 1B | 360 | 177 | Stem |
| | 1C | 390 | 149 | Beginning of recrystallization |
| TSA | 2A | — | 557 | Stem |
| | 2B | 240 | 530 | Stem + precipitation |
| | 2C | 270 | 575 | Stem + precipitation |
| | 2D | 300 | 385 | Recrystallized |
| | 2E | 380 | 357 | Recrystallized |
| Saccharin | 3A | — | 484 | Stem |
| | 3B | 250 | 500 | Stem |
| | 3C | 330 | 262 | Recrystallized |
| Butindiol | 4A | — | 484 (493) | Stem + layers |
| | 4B | 360 | 471 (483) | Stem + layers |
| | 4C | 400 | 424 | Stem + layers |
| | 4D | 430 | 251 | Beginning of recrystallization |
| Butindiol + saccharin | 5A | — | 857 | Laminar |
| | 5B | 290 | 765 | Laminar |
| | 5C | 320 | 773 | Laminar |
| | 5D | 350 | 418 | Recrystallized |

The Ni coating structures were determined on the basis of micrographs of galvanized coatings. The coatings were ascertained in various baths without and with additives such as TSA (toluene sulfonamide), saccharin and butindiol. The samples in each group designated with A were not heat treated. If one regards by way of example the sample series 5A to 5C, one will note that a temperature for heat treatment under 320° C. ensures an optimal crack formation. On the basis of the indicated hardness data, it can be established that even small temperature changes bring about significant differences of hardness in the coating. Thus the hardness of the coating can be optimized in addition to the brittleness through a compromise.

Table 2 illustrates the Co coating structures as a function of temperature. The samples were evaluated with the aid of micrographs, as were those from Table 1. The results allow a good determination of optimal precipitation temperatures just under the recrystallization temperature. No recrystallization could be determined for the additives TSA and butindiol in the coating bath, even for comparatively high temperatures.

TABLE 2

Co coating structure

| Additive | # | Temperature treatment [° C.] | Hardness HV 0.2 | Structure of the coating |
|---|---|---|---|---|
| Free of additives | 6A | | 289 | Stem (coarse) |
| | 6B | 420 | 300 | Stem (coarse) |
| | 6C | 490 | 286 | Stem (coarse) |
| | 6D | 520 | 256 | (50%) recrystallized |
| | 6F | 550 | 274 | Recrystallized |
| TSA | 7A | | 274 | Stem (coarse) |
| | 7B | 400 | 270 | Stem (coarse) |
| | 7C | 480 | 271 | Stem (coarse) |
| Butindiol | 9A | | 352 | Stem (very fine) |
| | 9B | 380 | 400 | Stem (very fine) |
| | 9C | 410 | 418 | Stem (very fine) |
| Butindiol + saccharin | 10A | | 326 | Stem + layers |
| | 10B | 240 | 379 | Stem + layers |
| | 10C | 360 | 350 | (10%) recrystallized |
| | 10D | 430 | 406 | (50%) recrystallized |
| | 10E | 460 | 411 | Recrystallized |

An advantageous configuration of the invention provides that the carbon content of the cold rolled strip lies under 0.5%. A further advantageous refinement of the invention provides that a prefinishing layer of Ni and/or Co or of a multilayer system on the basis of these elements is applied to the cold rolled strip prior to surface coating. It is especially appropriate for the prefinishing layer be diffusion annealed. But it can also be advantageous to apply the prefinishing layer using diffusion precipitation. It is especially suitable for the prefinishing layer to be applied as a C—Ni dispersion layer or as a C—Ni/Co alloy dispersion layer. It is moreover suitable to apply a dispersion coating and finally a surface coating after the diffusion-annealed prefinishing layer, whereby it is furthermore appropriate in accordance with the invention for the dispersion layer to be applied as a C—Ni dispersion layer or as a Ni/Co alloy dispersion layer. These various prefinishing layers under the surface coating have advantages, especially for corrosion resistance and conductivity.

Further advantageous features of the invention provide that instead of C and S, P is incorporated as a non-metallic element in the embrittled surface coating or a mixture of P, C and/or S, or that instead of C and S, N is incorporated as a non-metallic element in the embrittled surface coating, or a mixture of N, C and/or S and/or P. Although mostly C and S are incorporated into the coatings, it can be if need be advantageous to incorporate other non-metallic elements, especially P and N, into the surface coating, since these likewise act in an embrittling manner, but otherwise have different effects on the properties of the coating.

A further advantageous feature of the invention provides that the surface coating is selectively embrittled by temperature treatment according to the included non-metallic component. By a suitable choice of temperature and an amount of previously mentioned non-metallic elements set into proportion to this, the desired hardness of the surface can be set in addition to the formation of brittleness.

The device claims of the invention relate to a metal sheet or a battery can, which are associated with the method of the invention and to which the already mentioned advantages apply.

The invention claimed is:

1. Method for a heat treatment of a cold rolled strip the method comprising: selecting a temperature of the heat treatment that is less than a recrystallization temperature of a surface coating and above a precipitation temperature for compounds that accumulate on grain boundaries and include non-metallic elements and surface coating metal, wherein the surface coating comprises Ni and/or Co and non-metallic elements C and/or S, and wherein the cold rolled strip has a carbon content.

2. Method according to claim 1, wherein the carbon content of the cold rolled strip is less than 0.5%.

3. Method according to claim 1, further comprising applying a prefinishing layer of Ni and/or Co or of a multilayer system of these elements to the cold rolled strip before surface coating.

4. Method according to claim 3, wherein the prefinishing layer is diffusion-annealed.

5. Method according to claim 3, wherein the applying includes applying the prefinishing layer using diffusion precipitation.

6. Method according to claim 3, wherein the applying includes applying the prefinishing layer as a C—Ni dispersion layer or a C—Ni/Co alloy dispersion layer.

7. Method according to claim 4, further comprising applying a dispersion coating and a surface coating after the diffusion-annealed prefinishing layer.

8. Method according to claim 7, wherein the dispersion layer is applied as a C—Ni dispersion layer or as a C—Ni/Co alloy dispersion layer.

9. Method according to claim 1, wherein instead of C and S, P is incorporated as a non-metallic element into the surface coating, or a mixture of P, C and/or S.

10. Method according to claim 1, wherein instead of C and S, N is incorporated as a non-metallic element into the surface coating, or a mixture of N, C and/or S and/or P.

11. Method according to claim 1, wherein the surface coating is selectively embrittled according to the incorporated non-metallic component through heat treatment.

12. Method of claim 1, wherein the surface coating further comprises Fe, In, Pd, Au and/or Bi.

13. Sheet metal of low carbon content suitable for a deep drawing process, the sheet metal comprising: a cold rolled strip coated with a surface coating of Ni and/or Co embrittled by temperature treatment and incorporated non-metallic elements C and/or S, the surface coating has a large number of micro-cracks following a deep drawing or an iron drawing, wherein the surface coating is not recrystallized by the heat treatment and compounds of non-metallic elements are accumulated on grain boundaries with the surface coating material.

14. Sheet metal according to claim 13, wherein the low carbon content of the cold rolled strip is less than 0.5%.

15. Sheet metal according to claim 13, further comprising a prefinishing layer between the cold rolled strip and the embrittled surface coating that includes Ni and/or Co or of a multilayer system of these elements.

16. Sheet metal according to claim 15, wherein the prefinishing layer is diffusion-annealed.

17. Sheet metal according to claim 15, wherein the prefinishing layer is a dispersion layer.

18. Sheet metal according to claim 15, wherein the prefinishing layer is a C—Ni dispersion layer or a C—Ni/Co alloy dispersion layer.

19. Sheet metal according to claim 16, wherein a dispersion layer is applied between the diffusion-annealed prefinishing layer and the embrittled surface coating.

20. Sheet metal according to claim 19, wherein the dispersion layer is a C—Ni dispersion layer or a C—Ni/Co alloy dispersion layer.

21. Sheet metal according to claim 13, wherein instead of C and S, P is incorporated as a non-metallic element in the embrittled surface coating, or a mixture of P, C and/or S.

22. Sheet metal according to claim 13, wherein instead of C and S, N is incorporated as a non-metallic element in the embrittled surface coating, or a mixture of N, C and/or S and/or P.

23. Sheet metal according to claim 13, wherein the surface coating is selectively embrittled by the temperature treatment according to the included non-metal component.

24. Sheet metal of claim 13, wherein the surface coating further comprises Fe, In, Pd and/or Bi.

25. Battery can of low carbon content suited for the deep drawing process, the battery can comprising: a cold rolled strip coated with a surface coating of Ni and/or Co and incorporated non-metallic elements C and/or S, located on an inside embrittled and after a temperature treatment, the surface coating has a large number of micro-cracks following a deep drawing or stretch deep drawing, wherein the surface coating is not recrystallized by the heat treatment and compounds of non-metallic element with the surface coating material are deposited on the grain boundaries.

26. Batter can according to claim 25 wherein the low carbon content of the cold rolled strip is less than 0.5%.

27. Battery can according to claim 25, wherein the cold rolled strip has a prefinishing layer between the cold rolled strip and the embrittled surface coating which consists of Ni and/or Co or of a multilayer system of these elements.

28. Battery can according to claim 27, wherein the prefinishing layer is dispersion-annealed.

29. Battery can according to claim 27, wherein the prefinishing layer is a dispersion layer.

30. Battery can according to claim 27, wherein the prefinishing layer is a C—Ni dispersion layer or a C—Ni/Co alloy dispersion layer.

31. Battery can according to claim 28, wherein a dispersion layer is applied between the diffusion-annealed prefinishing layer and the embrittled surface coating.

32. Battery can according to claim 31, wherein the dispersion layer is a C—Ni dispersion layer or a C—Ni/Co alloy dispersion layer.

33. Battery can according to claim 25, wherein instead of C and S, P is incorporated as a non-metallic element in the embrittled surface coating, or a mixture of P, C and/or S.

34. Battery can according to claim 25, wherein instead of C and S, N is incorporated as a non-metallic element in the embrittled surface coating, or a mixture of N, C and/or S and/or P.

35. Battery can of claim 25, the surface coating further comprises Fe, In, Pd, Au and/or Bi.

* * * * *